(12) United States Patent
Zhan et al.

(10) Patent No.: US 11,943,185 B2
(45) Date of Patent: *Mar. 26, 2024

(54) DYNAMIC MEDIA OVERLAY WITH SMART WIDGET

(71) Applicant: Snap Inc., Santa Monica, CA (US)

(72) Inventors: Yiwen Zhan, Venice, CA (US); Peter Sellis, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,152

(22) Filed: Oct. 18, 2022

(65) Prior Publication Data

US 2023/0034848 A1 Feb. 2, 2023

Related U.S. Application Data

(63) Continuation of application No. 17/570,096, filed on Jan. 6, 2022, now Pat. No. 11,558,327, which is a
(Continued)

(51) Int. Cl.
*H04L 51/10* (2022.01)
*G06F 3/04842* (2022.01)
(Continued)

(52) U.S. Cl.
CPC .......... *H04L 51/10* (2013.01); *G06F 3/04842* (2013.01); *G06F 3/04845* (2013.01);
(Continued)

(58) Field of Classification Search
CPC .......... H04L 51/10; G11B 27/34; G06K 9/64; G06F 3/04842; G06F 3/04845; G06T 11/60; H04W 4/02
See application file for complete search history.

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
EP 2051480 A1 4/2009
(Continued)

OTHER PUBLICATIONS

"A Whole New Story", Snap, Inc., [Online] Retrieved from the Internet: <URL: https://www.snap.com/en-US/news/>, (2017), 13 pgs.
(Continued)

*Primary Examiner* — Angie Badawi
(74) *Attorney, Agent, or Firm* — Schwegman Lundberg & Woessner, P.A.

(57) ABSTRACT

Systems and methods are provided for receiving a background image for a media overlay to be applied to a message comprising an image or video, and at least one smart widget selection, and storing the media overlay comprising the background image and the at least one smart widget selection. The systems and methods further provide for receiving a request for the media overlay to be applied to a message comprising an image or video, analyzing context data associated with a computing device to determine that the media overlay is relevant to at least one aspect of the context data, determining data associated with the at least one smart widget based on the context data, and transmitting to the computing device, the media overlay and data associated with the at least one smart widget.

20 Claims, 13 Drawing Sheets

Related U.S. Application Data continuation of application No. 15/829,588, filed on Dec. 1, 2017, now Pat. No. 11,265,273.

(51) Int. Cl.

| | |
|---|---|
| *G06F 3/04845* | (2022.01) |
| *G06T 11/60* | (2006.01) |
| *G06V 10/75* | (2022.01) |
| *G11B 27/34* | (2006.01) |
| *H04W 4/02* | (2018.01) |

(52) U.S. Cl.
CPC ............ *G06T 11/60* (2013.01); *G06V 10/75* (2022.01); *G11B 27/34* (2013.01); *H04W 4/02* (2013.01)

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,519,584 | B1 | 2/2003 | Tognazzini et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |
| 8,234,350 | B1 | 7/2012 | Gu et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |

(56) References Cited

U.S. PATENT DOCUMENTS

| | | |
|---|---|---|
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 11,265,273 B1 | 3/2022 | Zhan et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |

(56) References Cited

U.S. PATENT DOCUMENTS

| | | |
|---|---|---|
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |

(56) References Cited

U.S. PATENT DOCUMENTS

| | | |
|---|---|---|
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0218554 A1 | 8/2014 | Yang et al. |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'Keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0362325 A1 | 12/2015 | Shin et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1* | 3/2016 | Chang .................. H04W 4/029 715/753 |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2016/0353030 A1 | 12/2016 | Gao et al. |
| 2017/0006094 A1 | 1/2017 | Abou Mahmoud et al. |
| 2017/0061308 A1 | 3/2017 | Chen et al. |

(56) References Cited

U.S. PATENT DOCUMENTS

| | | |
|---|---|---|
| 2017/0287006 A1 | 10/2017 | Azmoodeh et al. |
| 2019/0171338 A1 | 6/2019 | Voss et al. |
| 2022/0131823 A1 | 4/2022 | Zhan et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"About dynamic ads for travel", [Online]. Retrieved from the Internet: <URL: https://www.facebook.com/business/help/615412228665810>, (accessed Oct. 4, 2017), 4 pgs.

"About Dynamic Search Ads", [Online]. Retrieved from the Internet: <URL: https://support.google.com/adwords/answer/2471185?hl=en>, (accessed Oct. 4, 2017), 3 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/829,588, Corrected Notice of Allowability dated Oct. 21, 2021", 2 pgs.

"U.S. Appl. No. 15/829,588, Examiner Interview Summary dated Sep. 17, 2021", 2 pgs.

"U.S. Appl. No. 15/829,588, Final Office Action dated Feb. 7, 2020", 20 pgs.

"U.S. Appl. No. 15/829,588, Final Office Action dated Jun. 14, 2021", 11 pgs.

"U.S. Appl. No. 15/829,588, Non Final Office Action dated Jan. 11, 2021", 10 pgs.

"U.S. Appl. No. 15/829,588, Non Final Office Action dated Dec. 9, 2019", 16 pgs.

"U.S. Appl. No. 15/829,588, Notice of Allowance dated Oct. 14, 2021", 10 pgs.

"U.S. Appl. No. 15/829,588, Response filed Jan. 14, 2020 to Non Final Office Action dated Dec. 9, 2019", 12 pgs.

"U.S. Appl. No. 15/829,588, Response filed Apr. 1, 2021 to Non Final Office Action dated Jan. 11, 2021", 11 pgs.

"U.S. Appl. No. 15/829,588, Response filed May 6, 2020 to Final Office Action dated Feb. 7, 2020", 17 pgs.

"U.S. Appl. No. 15/829,588, Response filed Sep. 14, 2021 to Final Office Action dated Jun. 14, 2021", 13 pages.

"U.S. Appl. No. 17/570,096, Notice of Allowance dated Sep. 14, 2022", 8 pgs.

"Automatically customize your ads with dynamic text parameters", [Online]. Retrieved from the Internet: <URL:https://help.bingads.microsoft.com/apex/index/3/en-us/50811>, (accessed Oct. 4, 2017), 3 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RGOw>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: < URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP And Save File on Server", [Online] Retrieved from the Internet: <URL: http://code.rohitink.com/2012/12/28/watermark-images-in-php-and- save-file-on-server>, (Dec. 28, 2012), 4 pgs.

* cited by examiner

DYNAMIC MEDIA OVERLAY WITH SMART WIDGET

CLAIM OF PRIORITY

This application is a continuation of U.S. patent application Ser. No. 17/570,096, filed Jan. 6, 2022, which is a continuation of U.S. patent application Ser. No. 15/829,588, filed on Dec. 1, 2017, which are incorporated herein by reference in their entirety.

BACKGROUND

A messaging system may receive millions of messages from users desiring to share media content such as audio, images, and video between user devices (e.g., mobile devices, personal computers, etc.). The media content of these messages may be associated with a common geolocation, a common time period, a common event, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
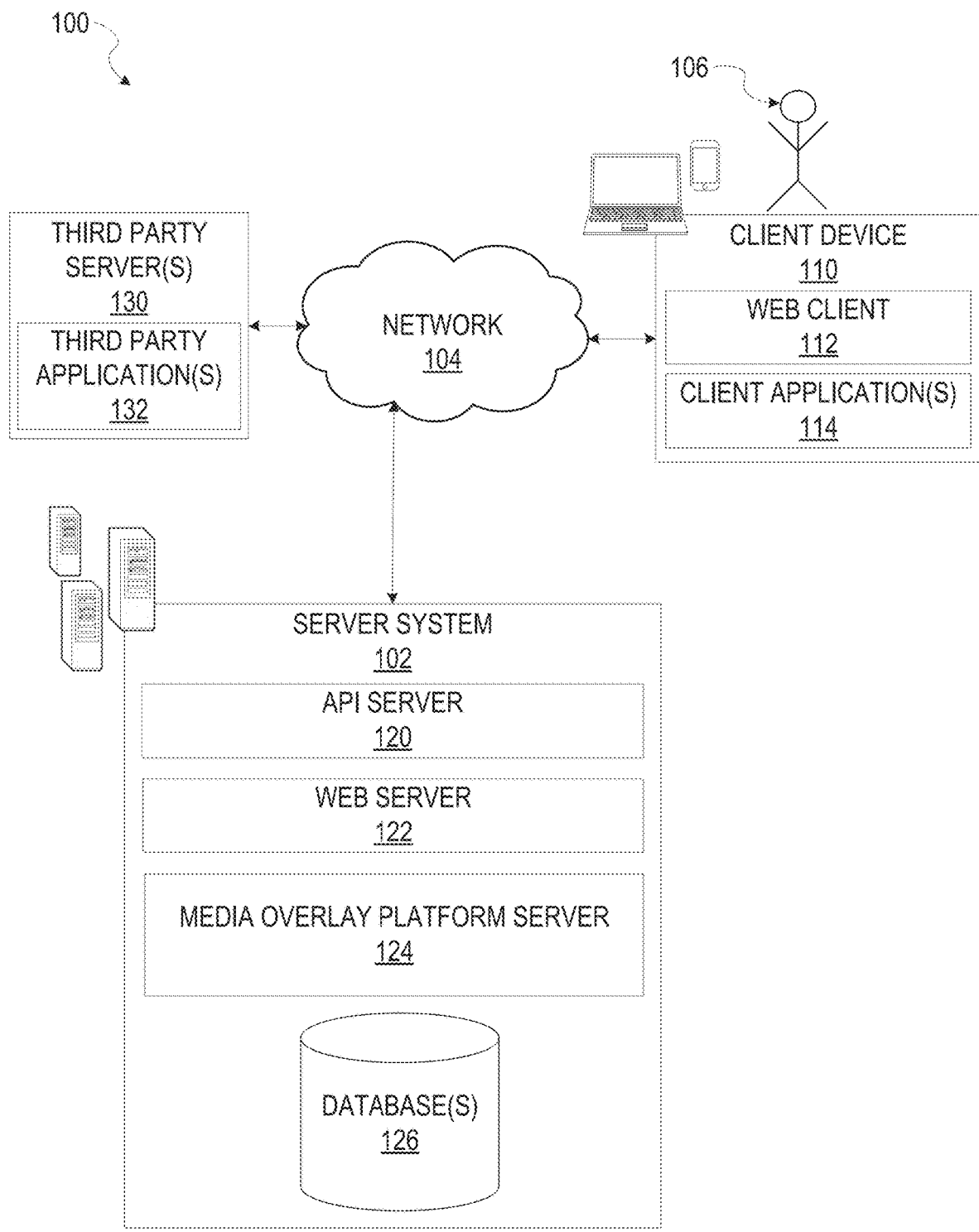
FIG. 1 is a block diagram illustrating a networked system, according to some example embodiments.

Systems and methods described herein relate to dynamic media overlays with one or more smart widgets that allow for dynamic content to be displayed in a media overlay for a message, based on context data associated with a computing device and/or a video or image. A smart widget is a display element associated with dynamic content. For example, a creator of a media overlay may be an artist or designer associated with a messaging network, a company, a service, or other entity, or the creator may be an individual user not associated with any particular entity. The creator may wish to create a media overlay to be made available to users that can display a location of the computing device associated with a user, information about audio playing on the computing device, event information associated with the location, user information, time or weather information, and so forth. For example, the creator may want to create a "Cinco de Mayo" media overlay for the upcoming holiday on May 5th. Instead of creating a separate media overlay for each location, or each potential event, weather, or what not, example embodiments allow the creator to add a smart widget to his media overlay image that will later fill in with a user's location or other information when the media overlay is displayed. This provides a scalable way of adding a location or other element to any media overlay, which significantly increases the media overlay's relevance and provides a more efficient system for providing media overlays.

A user may be creating a message comprising a photograph or video and text. The user may be located in Venice and it may be May 5th. The user may then be able to access the "Cinco de Mayo" media overlay to augment his message comprising the photograph or video. The media overlay would be rendered on the user's device to display "Cinco de Mayo Venice" as shown in the example 202 in FIG. 2. If the user was instead located in Manhattan, the example 204 would be displayed on the user's device.

Example embodiments address a number of technical challenges and provide a number of advantages. For example, typically a creator of a media overlay would need to manually create a separate media overlay for each location where the creator wanted the media overlay to be available. Using the "Cinco de Mayo" media overlay example above, the creator would have to manually create a separate design for each city (e.g., San Francisco, Los Angeles, Albuquerque, Miami, etc.). This is not scalable to a single state or region, let alone an entire country or worldwide. This is especially true for current events or trends where a creator would want to create and release a media overlay quickly. Accordingly, example embodiments provide for a scalable solution that allows for a faster creation and release process. Instead of manually creating separate media overlays, a media overlay platform is provided that allows a creator to set up media overlays that can dynamically display airports, train stations, parks, and other location based data, as one example of dynamic data.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, Ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to create or generate messages comprising images (e.g., photographs), video, and/or text. The client device 110 may be a device of a user that is used to create and edit media overlays.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110, and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, messaging application, electronic mail (email) application, an e-commerce site application, a mapping or location application, media overlay application, and the like.

In some embodiments, one or more client applications 114 may be included in a given one of the client devices 110 and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., to process user queries, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) server 120, a web server 122, and a media overlay platform server 124, which may be communicatively coupled with one or more databases 126.

The one or more databases 126 may be storage devices that store media overlays, smart widgets, messaging data, user data, computing device context data, media content data (e.g., data associate with video and images), and other data. The one or more databases 126 may further store information related to third party servers 130, third party applications 132, client devices 110, client applications 114, users 106, and so forth. The one or more databases 126 may include cloud-based storage.

The server system 102 may be a cloud computing environment, according to some example embodiments. The server system 102, and any servers associated with the server system 102, may be associated with a cloud-based application, in one example embodiment.

Figure 2:
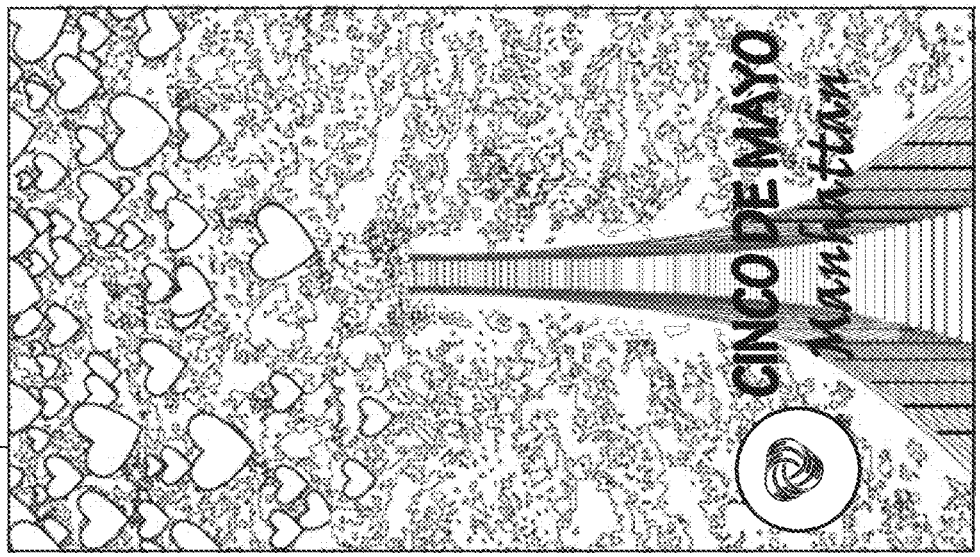
FIG. 2 illustrates example media overlays, according to some example embodiments.
Figure 2:
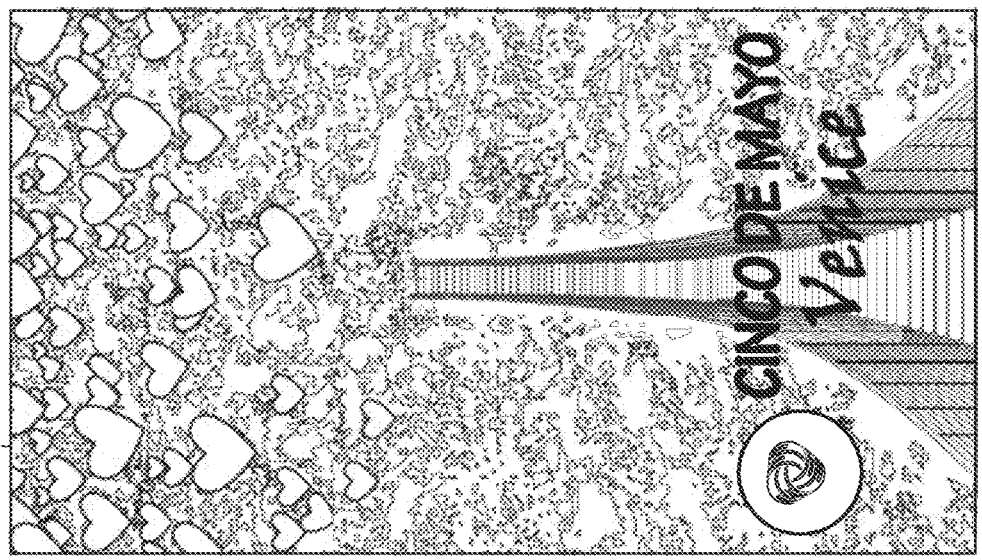

The media overlay platform server 124 may provide back-end support for third-party applications 132 and client applications 114, which may include cloud-based applications. In one embodiment, the media overlay platform server 124 may receive requests from third party servers or client devices for one or more media overlays, process the requests, provide one or more media overlays, and so forth. FIG. 2 show examples media overlays 202 and 204 that may be created and then stored by the media overlay platform server 124 and which may be accessed and analyzed by the media overlay platform server 124 for delivery to a computing device.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide functionality that is supported by relevant functionality and data in the server system 102.

Figure 3:
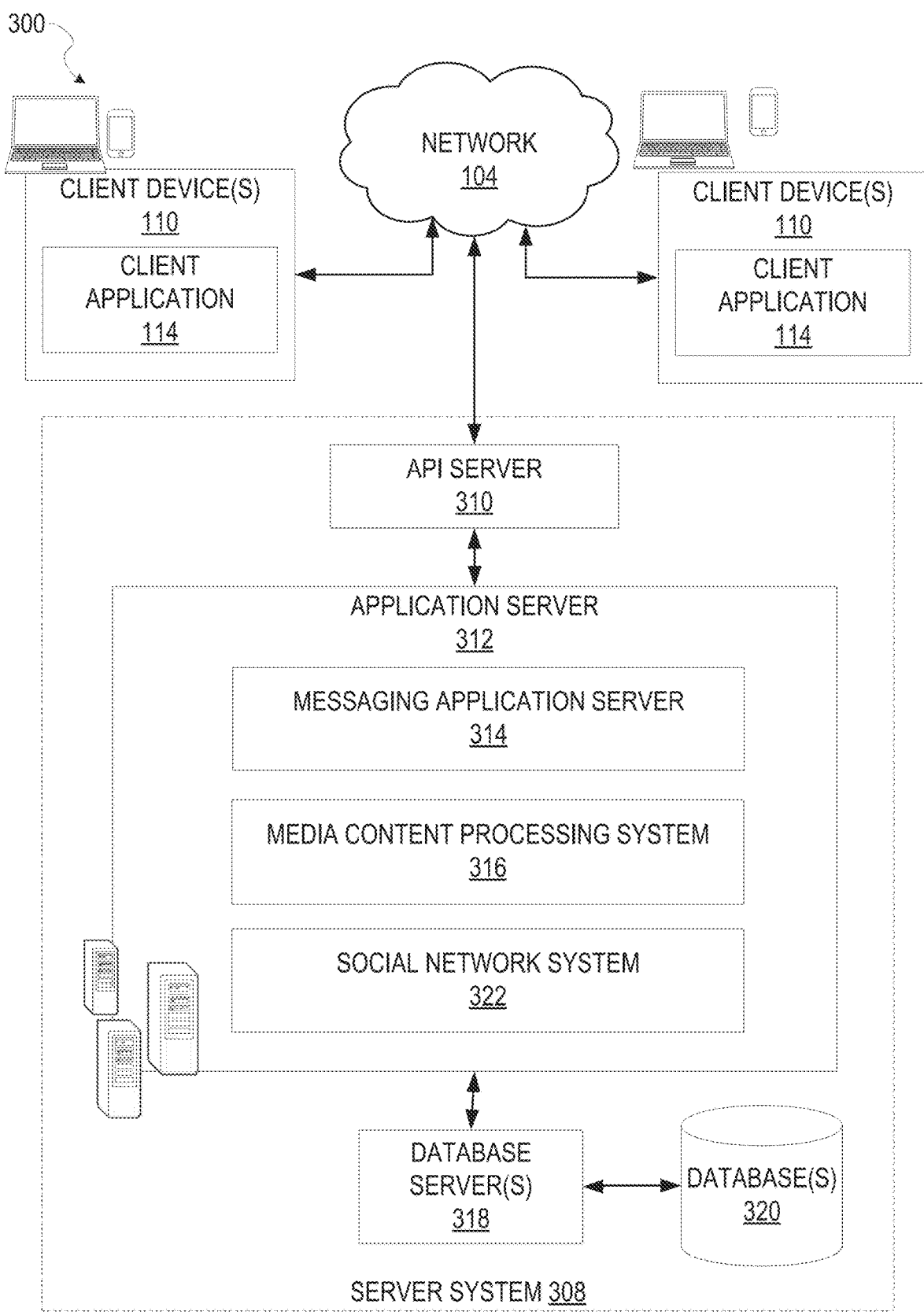
FIG. 3 is a block diagram showing an example messaging system for exchanging data (e.g., messages and associated content) over a network, according to some example embodiments.

FIG. 3 is a block diagram illustrating a networked system 300 (e.g., a messaging system) for exchanging data (e.g., messages and associated content) over a network. The networked system 300 includes multiple client devices 110, each of which hosts a number of client applications 114. Each client application 114 is communicatively coupled to other instances of the client application 114 and a server system 308 via a network 104.

The client device 110, client application 114, and network 104, are described above with respect to FIG. 1. The client device 110 may be a device of a user that is used to create media content items such as video, images (e.g., photographs), and audio, and send and receive messages containing such media content items to and from other users.

In one example, a client application 114 may be a messaging application that allows a user to take a photograph or video, add a caption, or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

A server system 308 may provide server-side functionality via the network 104 (e.g., the Internet or wide area network (WAN)) to one or more client device 110. The server system 308 may include an application programming interface (API) server 310, an application server 312, a messaging application server 314, a media content processing system 316, and a social network system 322, which may each be communicatively coupled with each other and with one or more data storage(s), such as database(s) 320. The server system 308 may also comprise the server system 102 of FIG. 1 or at least the media overlay platform server 124 of FIG. 1.

The server system 308 may be a cloud computing environment, according to some example embodiments. The server system 308, and any servers associated with the server system 308, may be associated with a cloud-based application, in one example embodiment. The one or more database(s) 720 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user information, user device information, and so forth. The one or more database(s) 320 may include cloud-based storage external to the server system 308 (e.g., hosted by one or more third party entities external to the server system 308). While the storage devices are shown as database(s) 320, it is understood that the system 100 may access and store data in storage devices such as databases 320, blob storages, and other type of storage methods.

Accordingly, each client application 114 is able to communicate and exchange data with other client applications 114 and with the server system 308 via the network 104. The data exchanged between client applications 114, and between a client application 114 and the server system 308, includes functions (e.g., commands to invoke functions) as well as payload data (e.g., text, audio, video or other multimedia data).

The server system 308 provides server-side functionality via the network 104 to a particular client application 114.

While certain functions of the system 300 are described herein as being performed by either a client application 114 or by the server system 308, it will be appreciated that the location of certain functionality either within the client application 114 or the server system 308 is a design choice. For example, it may be technically preferable to initially deploy certain technology and functionality within the server system 308, but to later migrate this technology and functionality to the client application 114 where a client device 110 has a sufficient processing capacity.

The server system 308 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, and date and time stamps, as examples. Data exchanges within the networked system 300 are invoked and controlled through functions available via user interfaces (UIs) of the client application 114.

In the server system 308, an application program interface (API) server 310 is coupled to, and provides a programmatic interface to, an application server 312. The application server 312 is communicatively coupled to a database server 318, which facilitates access to one or more database(s) 320 in which is stored data associated with messages processed by the application server 312.

The API server 310 receives and transmits message data (e.g., commands and message payloads) between the client device 110 and the application server 312. Specifically, the API server 310 provides a set of interfaces (e.g., routines and protocols) that can be called or queried by the client application 114 in order to invoke functionality of the application server 312. The API server 310 exposes various functions supported by the application server 312, including account registration; login functionality; the sending of messages, via the application server 312, from a particular client application 114 to another client application 114; the sending of media files (e.g., images or video) from a client application 114 to the messaging application server 314, and for possible access by another client application 114; the setting of a collection of media data (e.g., a gallery, story, message collection, or media collection); the retrieval of such collections; the retrieval of a list of friends of a user of a client device 110; the retrieval of messages and content; the adding and deletion of friends to a social graph; the location of friends within a social graph; opening an application event (e.g., relating to the client application 114); and so forth.

The application server 312 hosts a number of applications and subsystems, including a messaging application server 314, a media content processing system 316, and a social network system 322. The messaging application server 314 implements a number of message processing technologies and functions, particularly related to the aggregation and other processing of content (e.g., textual and multimedia content) included in messages received from multiple instances of the messaging client application 114. The text and media content from multiple sources may be aggregated into collections of content (e.g., called stories or galleries). These collections are then made available, by the messaging application server 314, to the client application 114. Other processor- and memory-intensive processing of data may also be performed server-side by the messaging application server 314, in view of the hardware requirements for such processing.

The application server 312 also includes a media content processing system 316 that is dedicated to performing various media content processing operations, typically with respect to images or video received within the payload of a message at the messaging application server 314. The media content processing system 316 may access one or more data storages (e.g., database(s) 320) to retrieve stored data to use in processing media content and to store results of processed media content.

The social network system 322 supports various social networking functions and services, and makes these functions and services available to the messaging application server 314. To this end, the social network system 322 maintains and accesses an entity graph 504 (depicted in FIG. 5) within the database 320. Examples of functions and services supported by the social network system 322 include the identification of other users of the networked system 300 with which a particular user has relationships or is "following," and also the identification of other entities and interests of a particular user.

The messaging application server 314 may be responsible for generation and delivery of messages between users of client devices 110. The messaging application server 314 may utilize any one of a number of message delivery networks and platforms to deliver messages to users. For example, the messaging application server 314 may deliver messages using electronic mail (e-mail), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WiFi, Long Term Evolution (LTE), Bluetooth).

Figure 4:
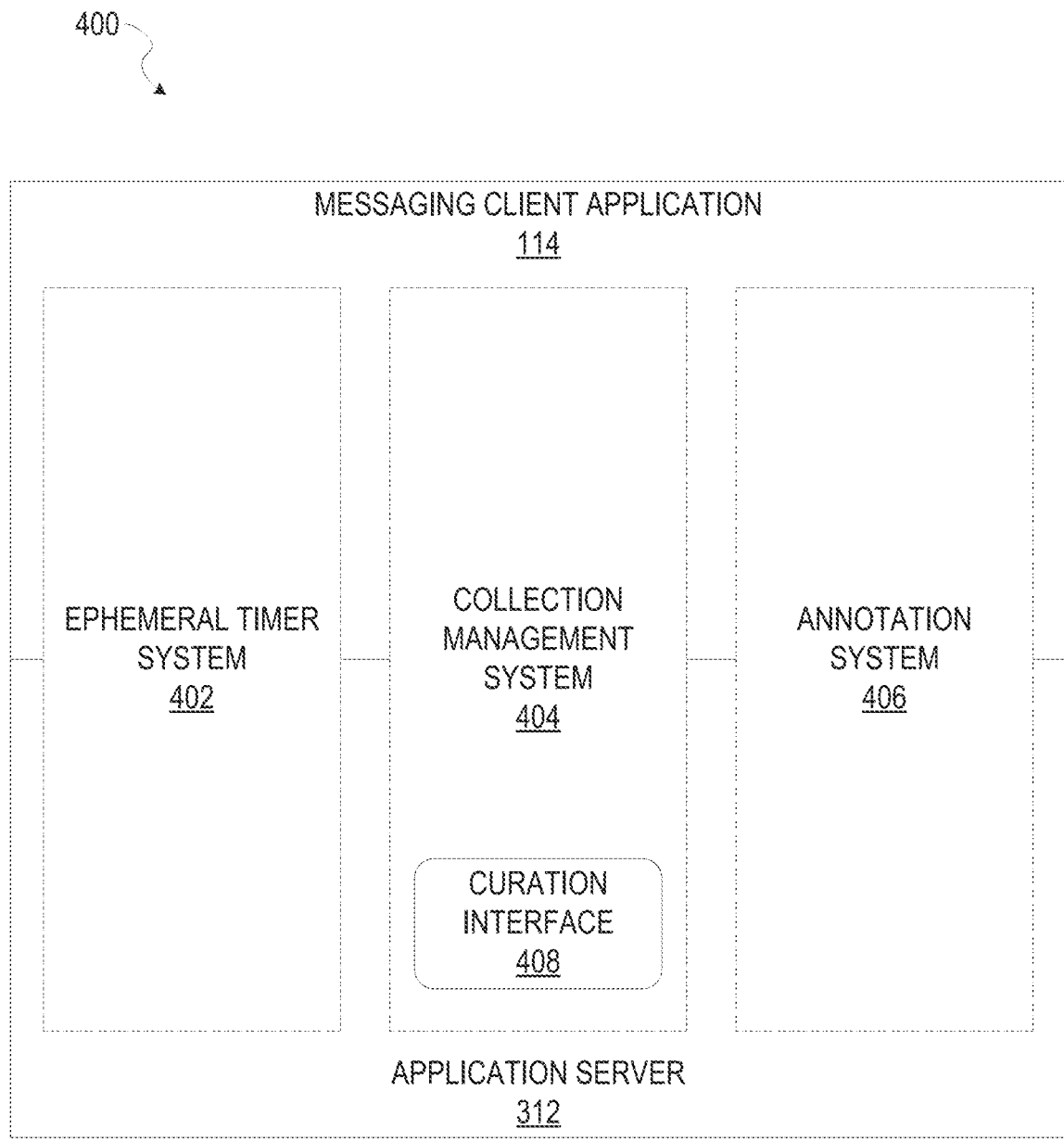
FIG. 4 is block diagram illustrating further details regarding a messaging system, according to some example embodiments.

FIG. 4 is block diagram 400 illustrating further details regarding the system 300, according to example embodiments. Specifically, the diagram 400 is shown to comprise the messaging client application 114 and the application server 312, which in turn embody a number of subsystems, namely an ephemeral timer system 402, a collection management system 404, and an annotation system 406.

The ephemeral timer system 402 is responsible for enforcing the temporary access to content permitted by the messaging client application 114 and the messaging application server 314. To this end, the ephemeral timer system 402 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 404 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 404 may also be responsible for publishing an icon that provides notification of the existence of a particular collection to the user interface of the messaging client application 114.

The collection management system 404 furthermore includes a curation interface 408 that allows a collection manager to manage and curate a particular collection of content. For example, the curation interface 408 enables an event organizer to curate a collection of content relating to a specific event (e.g., delete inappropriate content or redundant messages). Additionally, the collection management system 404 employs machine vision (or image recognition technology) and content rules to automatically curate a content collection. In certain embodiments, compensation (e.g., money, non-money credits or points associated with the communication system or a third party reward system, travel miles, access to artwork or specialized lenses, etc.) may be paid to a user for inclusion of user-generated content into a collection. In such cases, the curation interface 408 operates to automatically make payments to such users for the use of their content.

The annotation system 406 provides various functions that enable a user to annotate or otherwise modify or edit media content associated with a message. For example, the annotation system 406 provides functions related to the generation and publishing of media overlays for messages processed by the networked system 300. In one example, the annotation system 406 operatively supplies a media overlay (e.g., a filter or media augmentation) to the messaging client application 114 based on a geolocation of the client device 110. In another example, the annotation system 406 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice beach), a name of a live event, or a name of a merchant overlay (e.g., Beach Coffee House). In another example, the annotation system 406 uses the geolocation of the client device 110 to identify a media overlay that includes the name of a merchant at the geolocation of the client device 110. The media overlay may include other indicia associated with the merchant. The media overlays may be stored in the database 320 and accessed through the database server 318.

In one example embodiment, the annotation system 406 provides a user-based publication platform that enables users to select a geolocation on a map and upload content associated with the selected geolocation. The user may also specify circumstances under which a particular media overlay is to be offered to other users. The annotation system 406 generates a media overlay that includes the uploaded content and associates the uploaded content with the selected geolocation.

In another example embodiment, the annotation system 406 provides a merchant-based publication platform that enables merchants to select a particular media overlay associated with a geolocation via a bidding process. For example, the annotation system 406 associates the media overlay of a highest bidding merchant with a corresponding geolocation for a predefined amount of time.

In another example embodiment, the annotation system 406 provides one or more smart widgets, comprising one or more dynamic elements, that may be included with a media overlay to allow for a dynamic media overlay to be presented to a user based on various context data associated with the user or user device, such as location, event, and so forth. Functionality related to smart widgets are described in further detail below.

Figure 5:
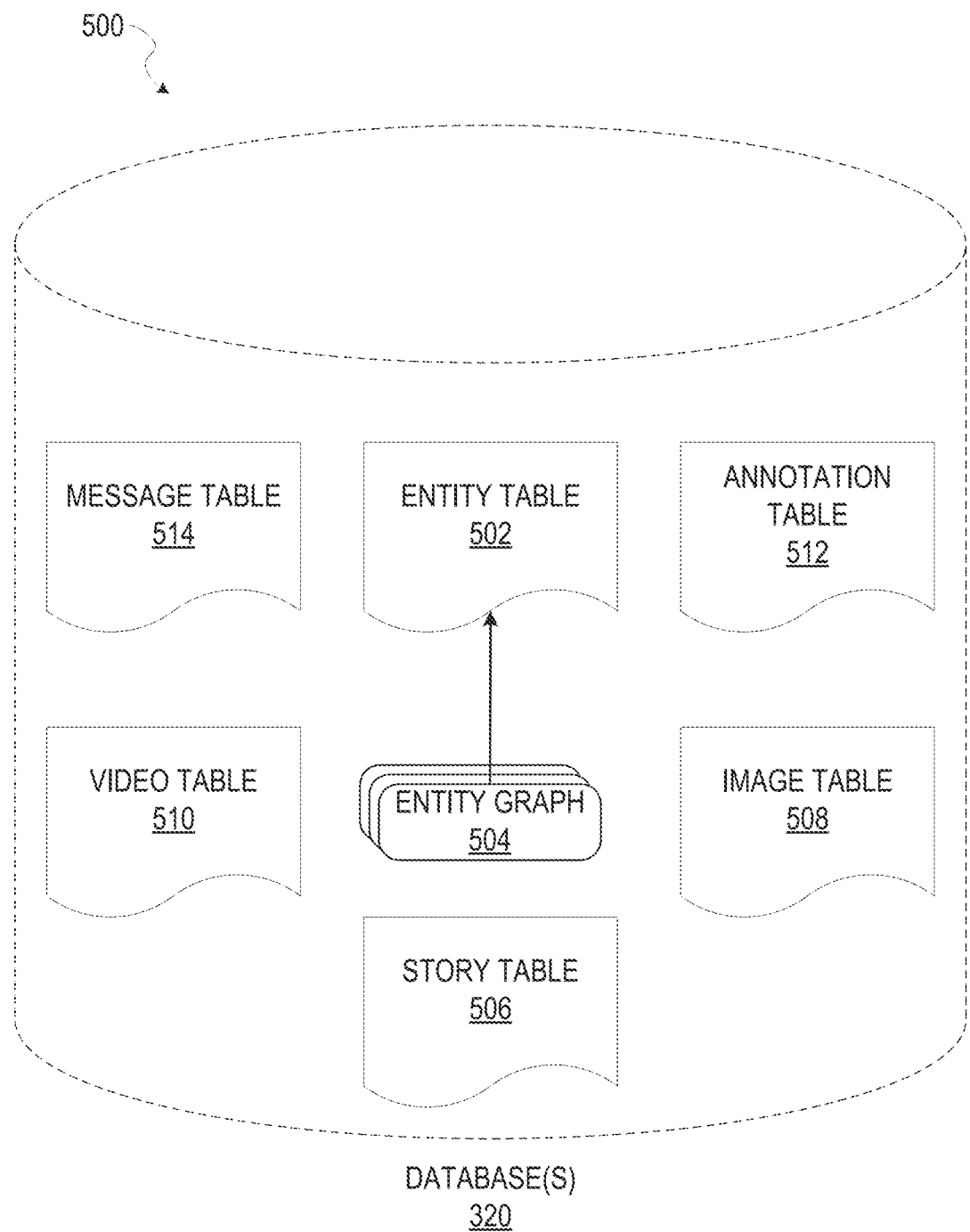
FIG. 5 is a schematic diagram illustrating data which may be stored in the database of the messaging server system, according to some example embodiments.

FIG. 5 is a schematic diagram 500 illustrating data which may be stored in the database(s) 320 of the server system 308, according to certain example embodiments. While the content of the database 320 is shown to comprise a number of tables, it will be appreciated that the data could be stored in other types of data structures (e.g., as an object-oriented database).

The database 320 includes message data stored within a message table 514. The entity table 502 stores entity data, including an entity graph 504. Entities for which records are maintained within the entity table 502 may include individuals, corporate entities, organizations, objects, places, events, and the like. Regardless of type, any entity regarding which the server system 308 stores data may be a recognized entity. Each entity is provided with a unique identifier, as well as an entity type identifier (not shown).

The entity graph 504 furthermore stores information regarding relationships and associations between entities. Such relationships may be social, professional (e.g., work at a common corporation or organization), interest-based, or activity-based, merely for example.

The database 320 also stores annotation data, in the example form of media overlays or filters, in an annotation table 512. Annotation data may also be referred to herein as "creative tools." Media overlays or filters, for which data is stored within the annotation table 512, are associated with and applied to videos (for which data is stored in a video table 510) and/or images (for which data is stored in an image table 508). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Example of data filters include current temperature at a specific location, a current speed at which a sending user is traveling, battery life for a client device 110, or the current time.

Other annotation data that may be stored within the image table 508 is so-called "lens" data. A "lens" may be a real-time special effect and sound that may be added to an image or a video.

As mentioned above, the video table 510 stores video data which, in one embodiment, is associated with messages for which records are maintained within the message table 514. Similarly, the image table 508 stores image data associated with messages for which message data is stored in the entity table 502. The entity table 502 may associate various annotations from the annotation table 512 with various images and videos stored in the image table 508 and the video table 510.

A story table 506 stores data regarding collections of messages and associated image, video, or audio data, which are compiled into a collection (e.g., a story, gallery, or media collection). The creation of a particular collection may be initiated by a particular user (e.g., each user for which a record is maintained in the entity table 502). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users, whose client devices 110 have location services enabled and are at a common location or event at a particular time, may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 6:
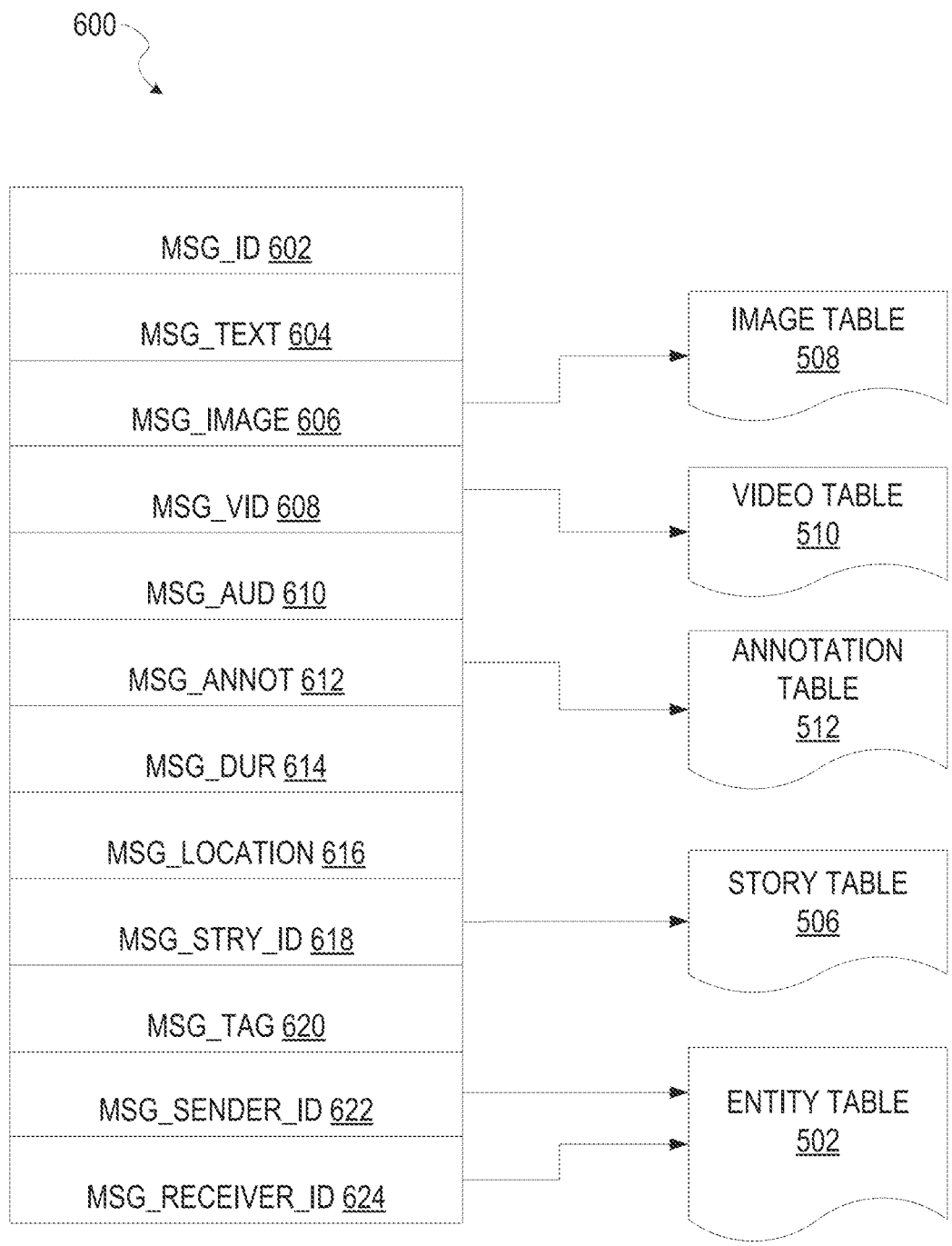
FIG. 6 is a schematic diagram illustrating a structure of a message, according to some embodiments, generated by a messaging client application for communication.

FIG. 6 is a schematic diagram illustrating a structure of a message 600, according to some embodiments, generated by a client application 114 for communication to a further client application 114 or the messaging application server 314. The content of a particular message 600 is used to populate the message table 514 stored within the database 320, accessible by the messaging application server 314. Similarly, the content of a message 600 is stored in memory as "in-transit" or "in-flight" data of the client device 110 or the application server 312. The message 600 is shown to include the following components:

- A message identifier 602: a unique identifier that identifies the message 600.
- A message text payload 604: text, to be generated by a user via a user interface of the client device 110 and that is included in the message 600.
- A message image payload 606: image data, captured by a camera component of a client device 110 or retrieved from memory of a client device 110, and that is included in the message 600.
- A message video payload 608: video data, captured by a camera component or retrieved from a memory component of the client device 110 and that is included in the message 600.
- A message audio payload 610: audio data, captured by a microphone or retrieved from the memory component of the client device 110, and that is included in the message 600.
- A message annotations 612: annotation data (e.g., media overlays such as filters, stickers, or other enhancements) that represents annotations to be applied to message image payload 606, message video payload 608, or message audio payload 610 of the message 600.
- A message duration parameter 614: parameter value indicating, in seconds, the amount of time for which content of the message 600 (e.g., the message image payload 606, message video payload 608, message audio payload 610) is to be presented or made accessible to a user via the messaging client application 114.

A message geolocation parameter 616: geolocation data (e.g., latitudinal and longitudinal coordinates) associated with the content payload of the message 600. Multiple message geolocation parameter 616 values may be included in the payload, with each of these parameter values being associated with respect to content items included in the content (e.g., a specific image within the message image payload 606 or a specific video in the message video payload 608).

A message story identifier 618: identifier values identifying one or more content collections (e.g., "stories") with which a particular content item in the message image payload 606 of the message 600 is associated. For example, multiple images within the message image payload 606 may each be associated with multiple content collections using identifier values.

A message tag 620: each message 600 may be tagged with multiple tags, each of which is indicative of the subject matter of content included in the message payload. For example, where a particular image included in the message image payload 606 depicts an animal (e.g., a lion), a tag value may be included within the message tag 620 that is indicative of the relevant animal. Tag values may be generated manually, based on user input, or may be automatically generated using, for example, image recognition.

A message sender identifier 622: an identifier (e.g., a messaging system identifier, email address, or device identifier) indicative of a user of the client device 110 on which the message 600 was generated and from which the message 600 was sent.

A message receiver identifier 624: an identifier (e.g., a messaging system identifier, email address, or device identifier) indicative of a user of the client device 110 to which the message 600 is addressed.

The contents (e.g., values) of the various components of message 600 may be pointers to locations in tables within which content data values are stored. For example, an image value in the message image payload 606 may be a pointer to (or address of) a location within an image table 508. Similarly, values within the message video payload 608 may point to data stored within a video table 510, values stored within the message annotations 612 may point to data stored in an annotation table 512, values stored within the message story identifier 618 may point to data stored in a story table 506, and values stored within the message sender identifier 622 and the message receiver identifier 624 may point to user records stored within an entity table 502.

Figure 7:
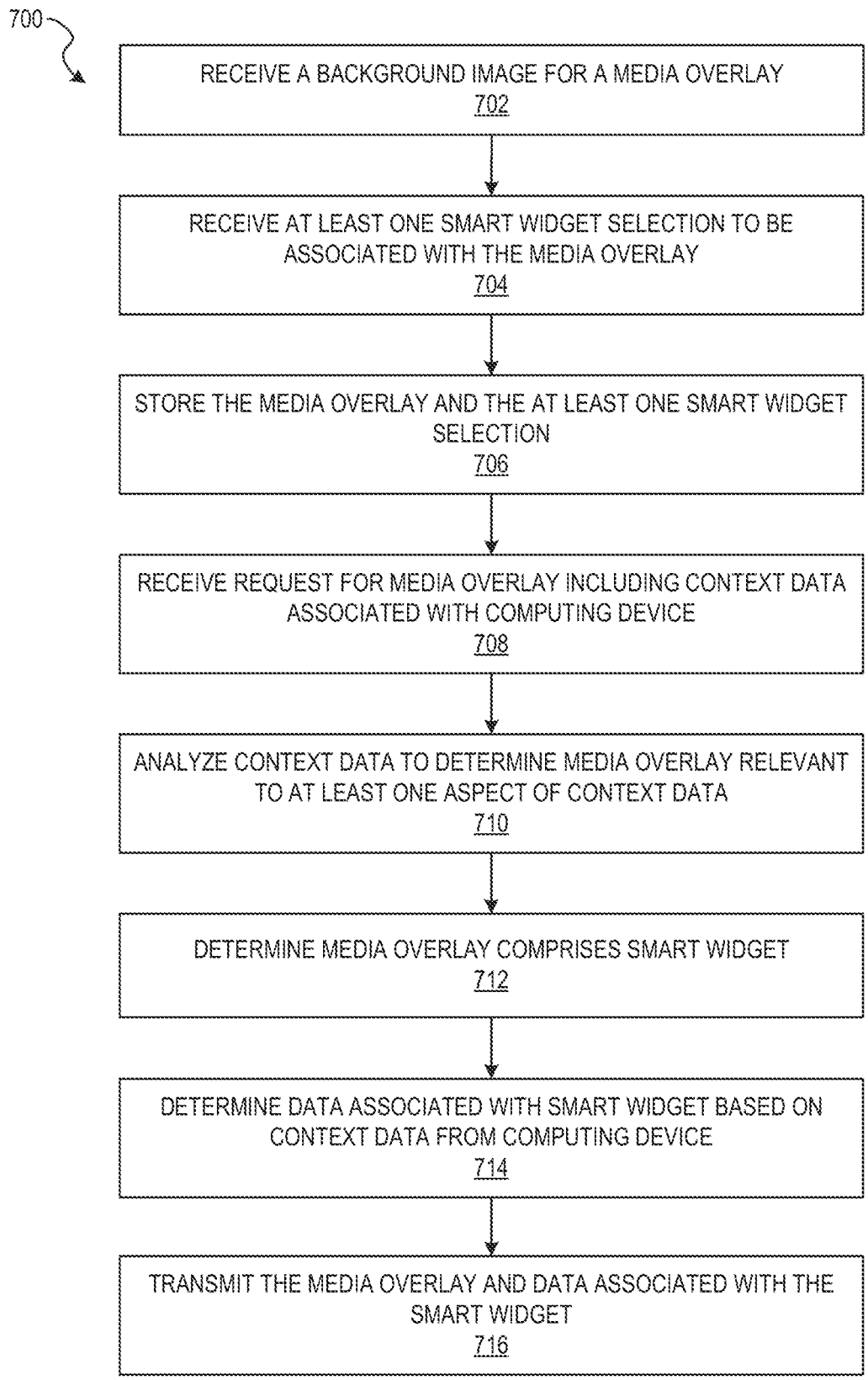
FIG. 7 is a flow chart illustrating aspects of a method, according to some example embodiments.

FIG. 7 is a flow chart illustrating aspects of a method, according to some example embodiments. For illustrative purposes, method 700 is described with respect to the networked system 100 of FIG. 1. It is to be understood that method 700 may be practiced with other system configurations in other embodiments.

Figure 8:
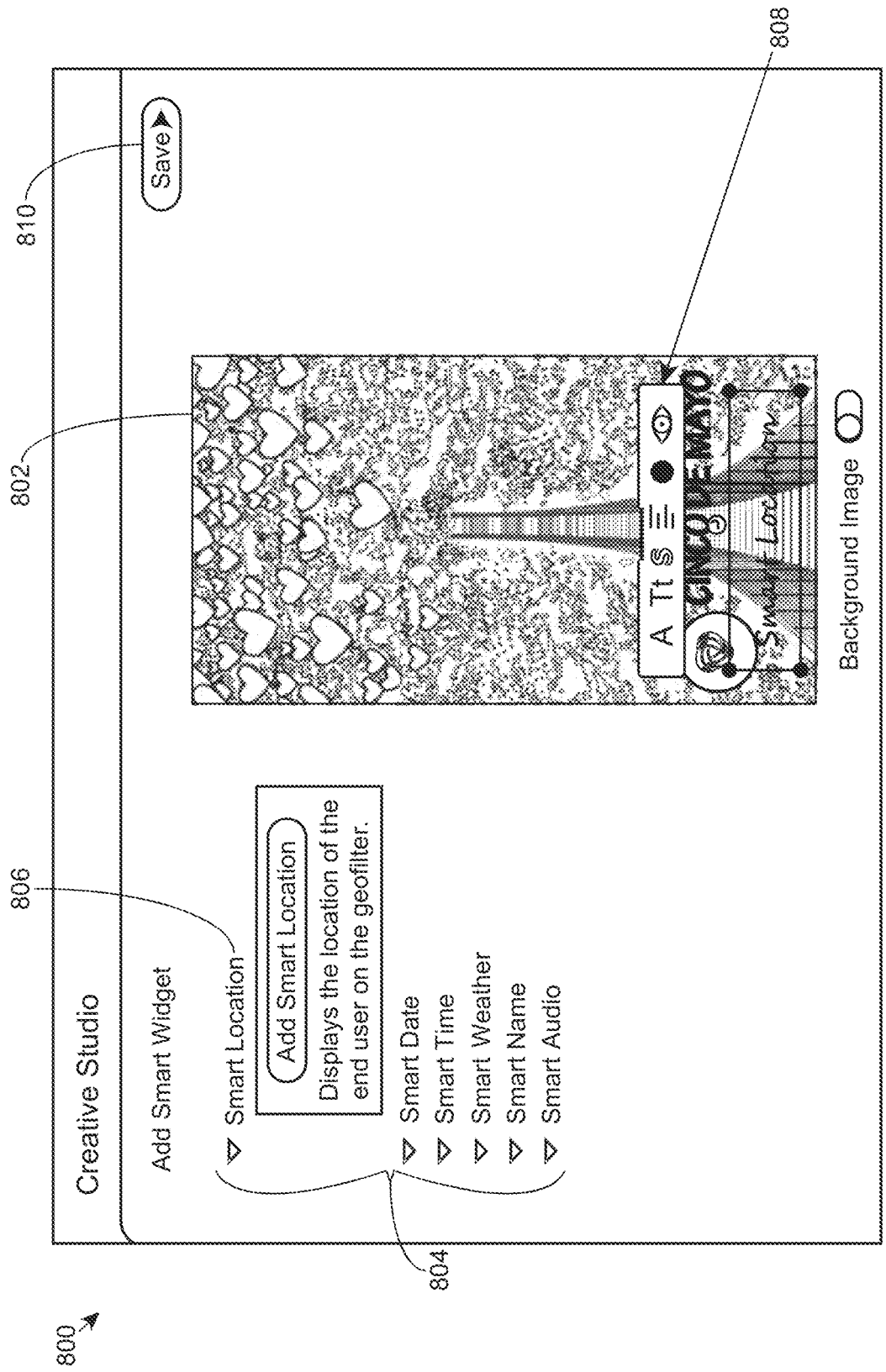
FIGS. 8-9 illustrate an example graphical user interface, according to some example embodiments.

In operation 702, a computing system (e.g., server system 102 or media overlay platform server 124) receives a background image for a media overlay to be applied to a message comprising an image or video. For example, a graphical user interface (GUI) may be provided to a creator of a media overlay (e.g., an artist or designer associated with a messaging network, a company, a service, or other entity, or the creator may be an individual user not associated with any particular entity) via a computing device (e.g., client device 110) to create the media overlay. FIG. 8 shows an example GUI 800 for creating a media overlay. In the example of FIG. 8, the creator has uploaded a background image 802 (e.g., a .png file) and has selected the "Smart Location" smart widget 806 from a selection of a plurality of smart widgets 804. The list of smart widgets in the example GUI 800 is an example of possible smart widgets. In other embodiments, there may be more of a selection of smart widgets, less of a selection of smart widgets, or a different selection of smart widgets than what is shown in FIG. 8.

The creator may select the smart location by interacting with the GUI (e.g., touching a display of the computing device, using one or more buttons on the computing device, using a mouse or other device to interact with the display, etc.). In response to the selection of the smart widget, a box or other visual element may appear on the background for the media overlay. This box may be moved to the location desired on the media overlay and resized to the size at which the creator wishes the smart widget to be displayed. The box may also be rotated.

Figure 10:
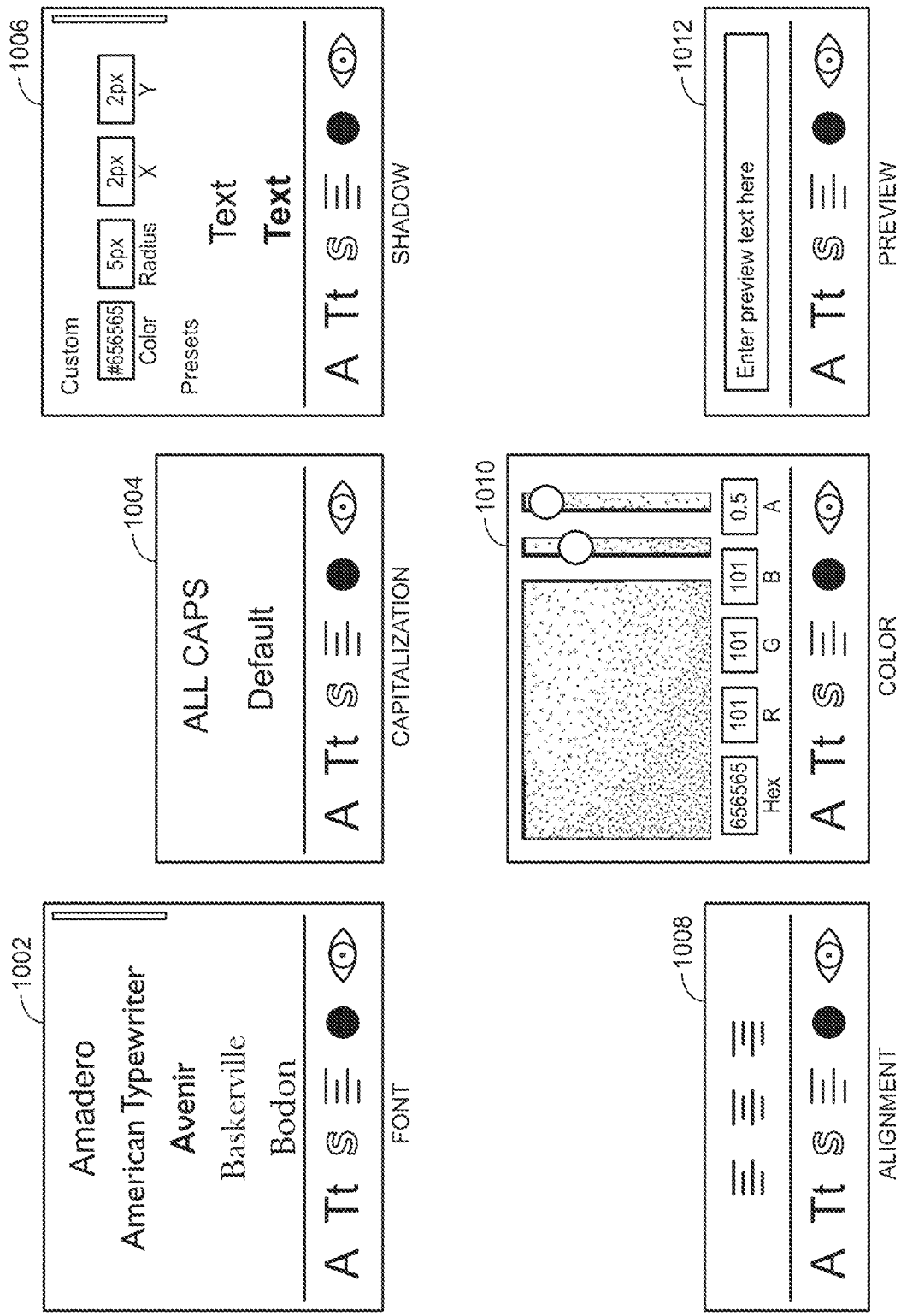
FIG. 10 illustrates example attributes for a smart widget, according to some example embodiments.

The GUI further provides tools 808 for providing attributes to be associated with the smart widget. For example, the creator of the media overlay may select a font type, capitalization (e.g., all caps, Camel Case, first word capitalized, all lower case, etc.), shadowing (color, radius, x/y offsets, with some presets, etc.), alignment of text (e.g., left, center, right), color, and a preview of how text for the smart widget may appear. FIG. 10 shows example interface elements 1002-1012 for each of these attribute options. These attributes are just example attributes. More, less, or different attributes may be provided in the GUI. Other examples of attributes may be underlining, italics, font size, transparency, bold, and so forth.

Figure 9:
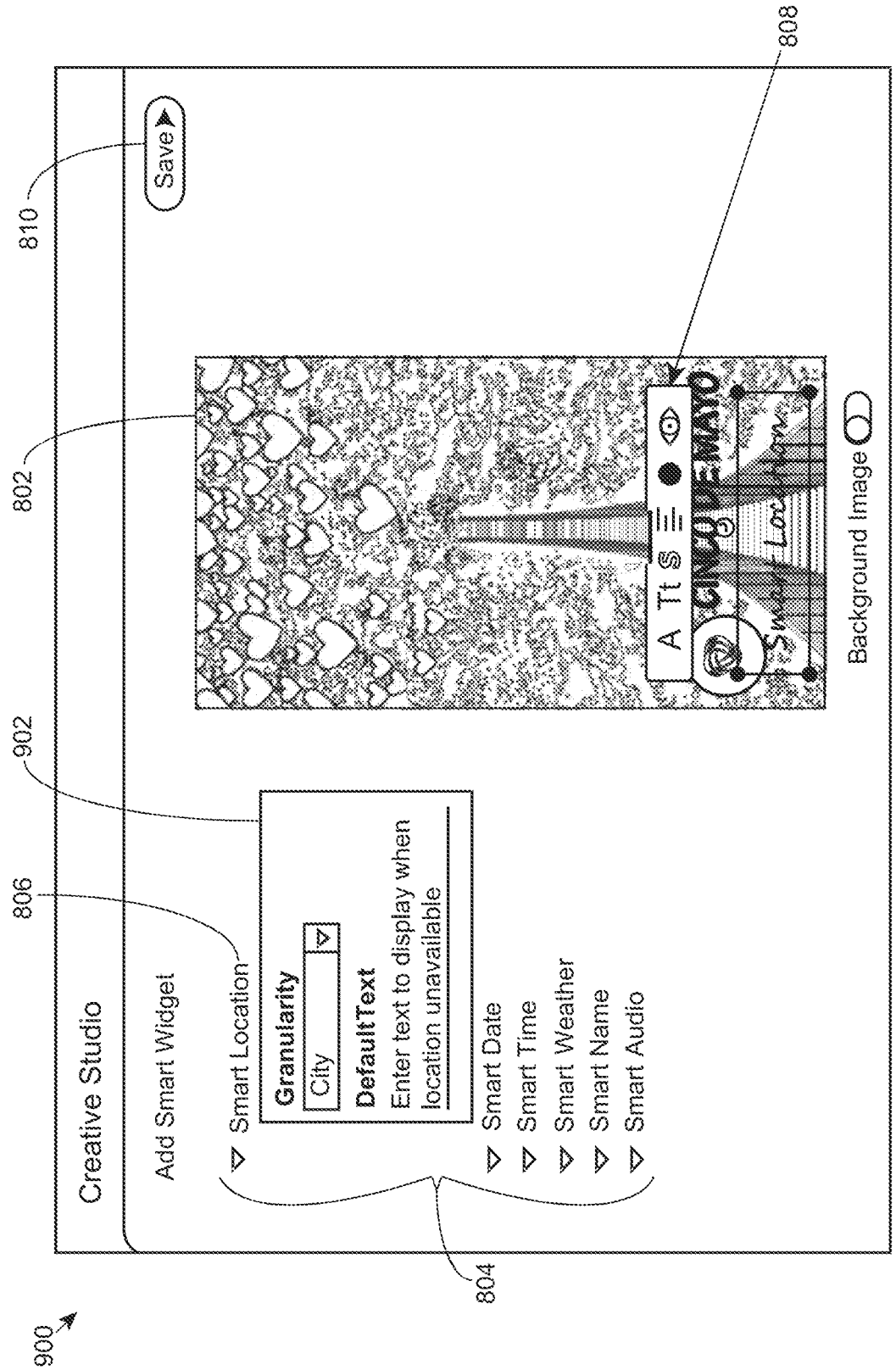

The GUI may further provide an option to choose the granularity for the smart widget, as shown in FIG. 9. In the GUI 900 of FIG. 9, a granularity element 902 is displayed for the creator to input the level of granularity for the location. For example, the creator may choose city, state, neighborhood, city and state initials, zip code, country, county, school, college, airport, train station, venue, or other location. For example, a city selection may display "Seattle," a city and state initials may display "Seattle, WA," a state may display "New York," a state initials may display "NY," a zip code may display "94706," neighborhood may display "Santa Monica," a high school may display "Los Angeles High School," a college may display "California State University," an airport may display "LAX," and so forth. The GUI may further provide an option to input default text for when location information may be unavailable (e.g., the computing system cannot get GPS or other location data from a computing device). The GUI 800 or 900 may further provide an option 810 to save the media overlay.

Returning to FIG. 7, after the computing system receives the background image (e.g., uploaded .png file) for the media overlay, it receives at least one smart widget selection to be associated with the media overlay in operation 704. For example, the computing system may receive a selection of a smart location widget or one or more other smart widgets via the GUI 800. The computing system may further receive attributes for each selected smart widget. As explained above, an attribute may include a location of the widget on the media overlay, a font for text associated with the smart widget, a color for text associated with the smart widget, a bounding box for text associated with the smart widget, a maximum font size for text associated with the smart widget, a minimum font size for text associated with the smart widget, an alignment for text associated with the smart widget, a shadow for text associated with the smart widget, a default spelling for text associated with the smart widget, a transparency value for text associated with the smart widget, and so forth.

In operation 706, the computing system stores the media overlay comprising the background image and the one or more smart widget selections in one or more databases (e.g., database 126 or 320). The media overlay may be stored separate from the one or more smart widgets. For example, the media overlay may be stored as a .png image and the one or more smart widgets may be stored separately and associated with one or more elements (e.g., font type, alignment, etc.). The stored media overlay may be provided to a computing device to be applied to a message comprising a video or an image.

In operation 708, the computing system receives, from a computing device (e.g., client device 110), a request for a media overlay to be applied to a message comprising a video or image. The request may comprise context data (e.g., a location of the computing device, audio playing on the computing device (e.g., song, speech, etc.), weather at the location of computing device, time of day, day of the week, name of a user associated with the computing device, etc.) associated with the computing device. For example, a user associated with the computing device may use the computing device to capture the video or image using a camera of the computing device. The user may wish to augment the video or image with text, a media overlay, a lens, or other creative tool. The computing device may detect that the user is capturing an image or video and send a request to the computing system to request media overlays to provide to the user. The request may comprise context data associated with the computing device, such as GPS or other location information, user information, information associated with the image or video, a copy or portion of the image or video, weather data, time data, date data, or other information.

In operation 710, the computing system may analyze the request to determine whether one or more media overlays are relevant to one or more aspects (e.g., elements) of the context data. In one example, media overlays may be associated with one or more triggers for which they are relevant to be sent to a computing device. Example triggers may be a geolocation (e.g., city, state, venue, restaurant, location of interest, school, etc.), time of day (e.g., breakfast time, sunrise, commute time, 3:30 pm, etc.), date (e.g., Wednesday, a holiday, the date of an event, etc.), audio detected by the computing device (e.g., background audio, audio associated with a video being captured, etc.), and so forth. For example, the media overlay in FIG. 2 may be triggered if the date is May 5th. Another media overlay may be triggered if the computing device is located in a particular venue (e.g., concert venue, theater, etc.). Another media overlay may be triggered based on a time of day, such as morning, or sunset. And yet another media overlay may be triggered based on a song being detected.

For example, the computing system may analyze the context data to determine whether data in the context data triggers one or more media overlays of a plurality of media overlays. In one example, the computing system may determine that the context data comprises geolocation data. The computing system compares the geolocation data of the context data to a geolocation trigger for one or more of the plurality of media overlays to determine a match between the geolocation data of the context data and a geolocation trigger for one or more media overlays.

In another example, the computing system determines that the context data comprises geolocation data and determines that the geolocation data is associated with an event. For example, the computing system may use map data (e.g., stored in one or more databases 320 or via third party sources) to determine that there is a concert venue associated with the geolocation and use event scheduling data (e.g., stored in one or more databases 320 or via third party sources) for the concert venue to determine that a particular concert is currently occurring at the concert venue. The computing system compares the event (e.g., the particular concert) to an event trigger (e.g., a trigger for that particular concert) for one or more media overlays to determine a match between the event associated with the geolocation data of the context data and an event trigger for one or more media overlays.

In another example, the computing system determines that the context data comprises a date for an image or video to be included in a message. The computing system compares the date for the image or video to a date trigger for one or more media overlays to determine a match between the date for the image or video and a date trigger for one or more media overlays.

In yet another example, the computing system determines that the context data includes a portion of an audio stream or an audio footprint. The computing system may determine that the audio is for a particular song or speech, associated with a particular artist, or the like. The computing system compares the song name, speech, artist name, or the like, to an audio trigger for one or more media overlays to determine a match between the audio in the context data and the audio trigger for one or more media overlays.

In this way, the computing system determines that one or more media overlays is relevant to provide to the computing device. In another example, the computing device may request one or more specific media overlays.

In operation 712, for each relevant media overlay (or for each specifically requested media overlay), the computing system accesses the media overlay and determines whether the media overlay comprises one or more smart widgets. For example, the computing system may access the media overlay in the one or more databases and also access information associated with the media overlay that indicates that one or more smart widgets are associated with the media overlay.

In operation 714, the computing system determines data associated with the one or more smart widgets. For example, the computing system may use the context data received from the computing device, other data (e.g., data associated with a user of the computing device, date or time information, etc.), data derived from the context data (e.g., venue or place of interest from geolocation information in the context data), and so forth, to determine the date for the one or more smart widgets. Using the example media overlay in FIG. 2, the computing device may determine that the computing device is located in Venice and thus, Venice is the data that is associated with the location smart widget in this example (e.g., the data string "Venice").

In operation 716, the computing system transmits the media overlay and data associated with the at least one smart widget to the computing device. The data associated with the at least one smart widget may also comprise attributes associated with the smart widget. After receiving the media overlay and data associated with the at least one smart widget for the media overlay, the computing device renders the content for the at least one media overlay. For example, the computing device would render the text "Cinco de Mayo Venice" using data for the city name and in the font, color, and so forth indicated by the attributes for the smart widget.

The computing device would then apply the media overly "Cinco de Mayo Venice" to the user's video or image.

Figure 11:
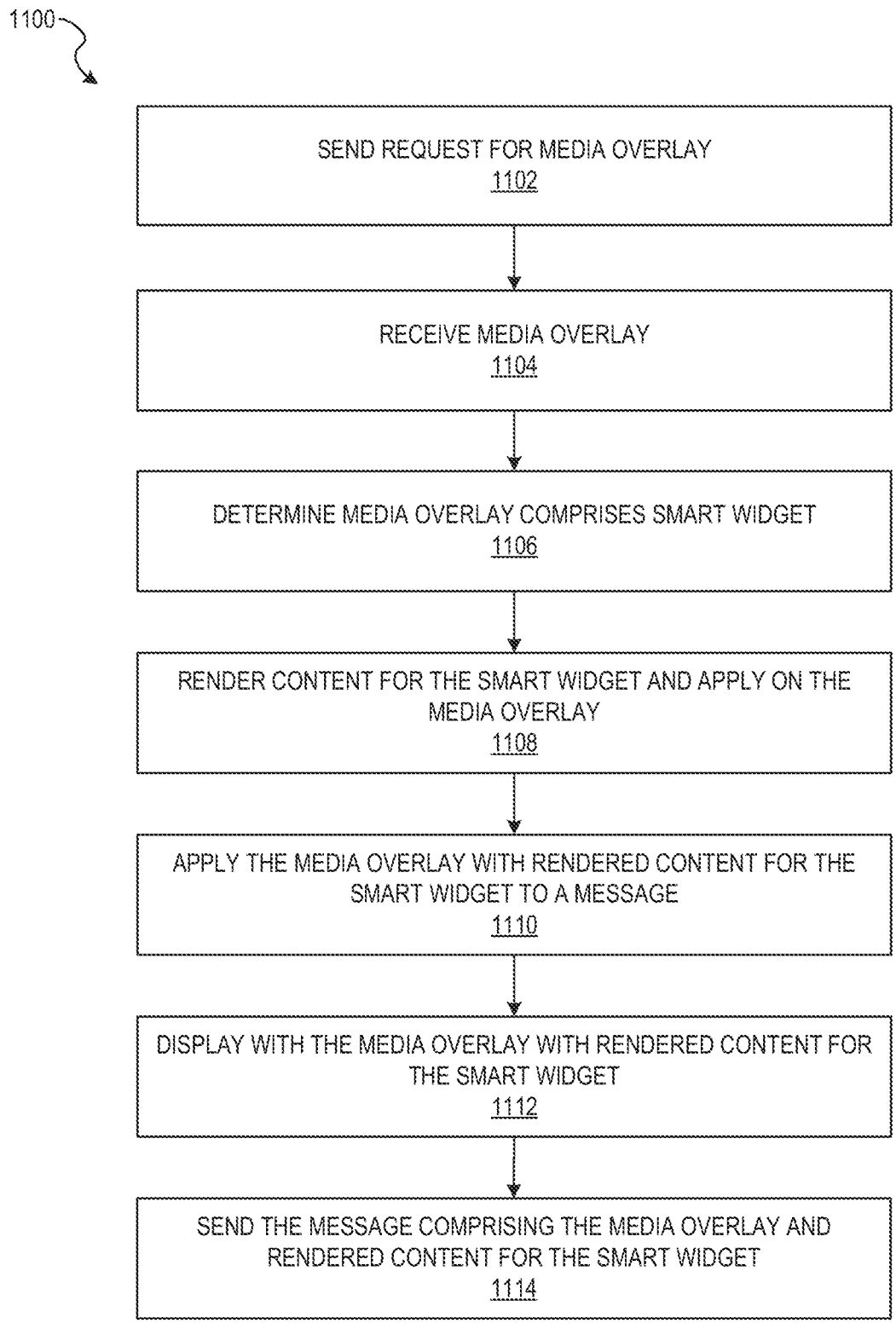
FIG. 11 is a flow chart illustrating aspects of a method, according to some example embodiments.

FIG. 11 is a flow chart illustrating aspects of a method, according to some example embodiments, for rendering a media overlay. For illustrative purposes, method 1100 is described with respect to the networked system 100 of FIG. 1. It is to be understood that method 1100 may be practiced with other system configurations in other embodiments.

In operation 1102, the computing device sends a request for one or more media overlays, as described above (e.g., a request for one or more specific media overlays or for relevant media overlays) to the computing system. The computing device may generate the context data for the request based on GPS or other location data detected by the computing device, data from the image or video (e.g., object recognition of elements within the image or video, audio, etc.), speed detected by an accelerometer or other means, altitude detected by the computing device, time of day or local time zone, day of the week, weather, temperature, a Quick Response (QR) Code or bar code, and so forth. The computing device receives the requested one or more media overlays in operation 1104, from the computing system.

In operation 1106, the computing device determines that the media overlay comprises one or more smart widgets based on the data received with the media overlay from the computing system. For example, the data may specify the one or more smart widgets, or the fact that there are one or more smart widgets may be inferred by the amount and type of data received by the computing device.

In operation 1108, the computing device renders the content for the smart widget and applies it to the media overlay. For example, the computing device would render the text "Cinco de Mayo Venice" using data for the city name and in the font, color, and so forth indicated by the attributes for the smart widget. For example, the computing device may take the text "Venice" and fit it into a bounding box based on the attributes, such as font type and alignment, and resize intelligently if necessary to fit it within the bounding box. The computing device applies the color, shadow, and other attributes. The computing device applies the rendered content on the media overlay to generate the media overlay to display to the user.

The user may then select the media overlay to be applied to a message comprising an image or video. The computing device receives the selection and in 1110, applies the media overlay with the rendered content for the smart widget to the message (e.g., the media overlay is overlaid on the image or video in the message), and displays the media overlay with the rendered content for the smart widget on a display of the computing device, in operation 1112. For example, the computing device would then apply the media overly "Cinco de Mayo Venice" to the user's video or image.

The user may wish to send the message to one or more other users. The computing device may receive a request from the user to send the message, and send the message comprising the media overlay and the rendered content for the smart widget, in operation 1114. For example, the computing device may send the message via the computing system to the one or more users. The computing system receives the message comprising the background image and the rendered content for the smart widget (this could be separate or in one file), and then the computing system sends the message to the one or more users. The message with the media overlay and rendered smart widget is then displayed on a computing device for the one or more users.

Example embodiments describe certain processes or actions performed by a computing system and/or a computing device. It is understood that in other embodiments the computing system and/or computing device may perform all or a different subset of the processes or actions described.

Figure 12:
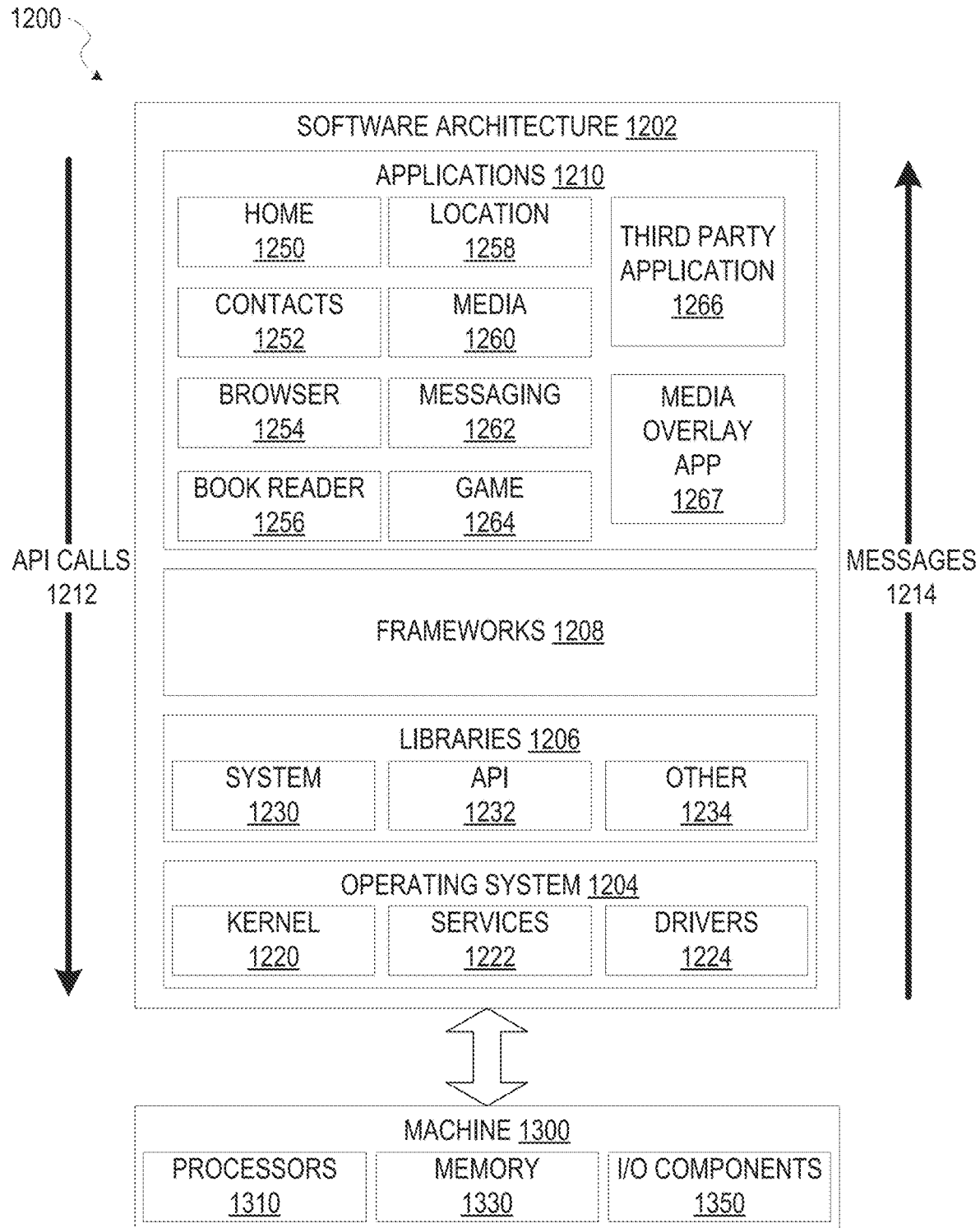
FIG. 12 is a block diagram illustrating an example of a software architecture that may be installed on a machine, according to some example embodiments.

FIG. 12 is a block diagram 1200 illustrating software architecture 1202, which can be installed on any one or more of the devices described above. For example, in various embodiments, client devices 110 and server systems 102, 120, 122, 124, 130, 308, 310, 312, 314, 316, 322 may be implemented using some or all of the elements of software architecture 1202. FIG. 12 is merely a non-limiting example of a software architecture, and it will be appreciated that many other architectures can be implemented to facilitate the functionality described herein. In various embodiments, the software architecture 1202 is implemented by hardware such as machine 1300 of FIG. 13 that includes processors 1310, memory 1330, and input/output (I/O) components 1350. In this example, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke API calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party applications 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1266 can invoke the API calls 1212 provided by the operating system 1204 to facilitate functionality described herein.

Some embodiments may particularly include a media overlay application 1267. In certain embodiments, this may be a stand-alone application that operates to manage communications with a server system such as third party servers 130 or server systems 102 or 708. In other embodiments, this functionality may be integrated with another application (e.g., messaging application 1262). The media overlay application 1267 may request and display various data related to messaging, media content, media collections, media overlays, and so forth, and may provide the capability for a user 106 to input data related to the system via a touch interface, keyboard, or using a camera device of machine 1300, communication with a server system via I/O components 1350, and receipt and storage of object data in memory 1330. Presentation of information and user inputs associated with the information may be managed by media overlay application 1267 using different frameworks 1208, library 1206 elements, or operating system 1204 elements operating on a machine 1200.

Figure 13:
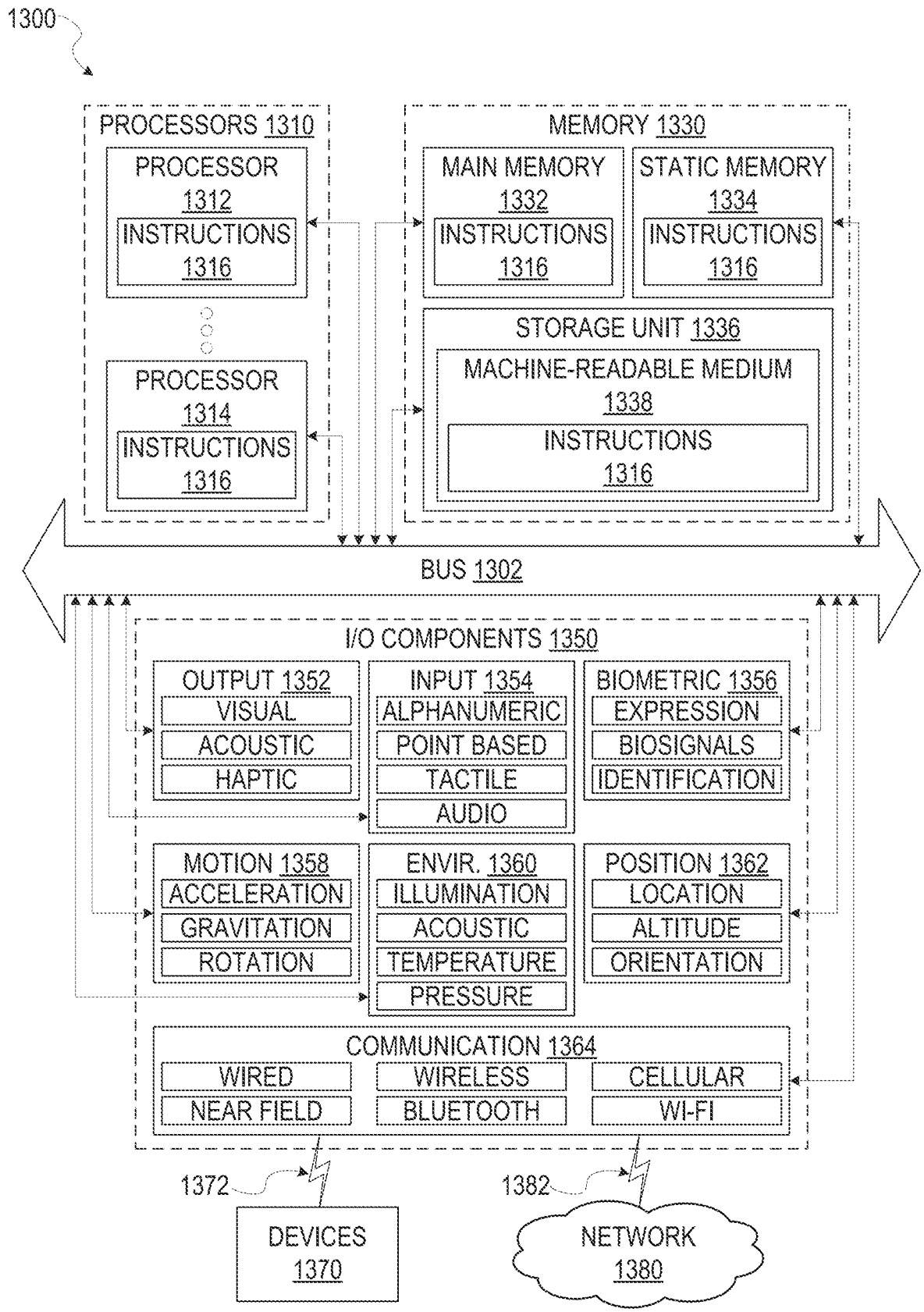
FIG. 13 illustrates a diagrammatic representation of a machine, in the form of a computer system, within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine or system 102, 120, 122, 124, 130, 308, 310, 312, 314, 316, 322, and the like, or a client device 110 in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1216 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1310 with a single core, a single processor 1310 with multiple cores (e.g., a multi-core processor 1310), multiple processors 1312, 1314 with a single core, multiple processors 1312, 1314 with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown, in an example embodiment, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine 1300 or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium 1338 should be considered as being transportable from one physical location to another. Additionally, since the machine-readable medium 1338 is tangible, the medium 1338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   sending, by a computing device to a computing system, context data associated with the computing device, the context data comprising a portion of an audio stream;
   receiving, from the computing system, a media overlay corresponding to the context data;
   determining that the media overlay comprises a smart widget selection corresponding to a display element comprising dynamic content to be displayed on the media overlay based on the context data;
   based on determining that the media overlay comprises the smart widget selection, generating content comprising information about the portion of the audio stream, the content to be displayed as the display element corresponding to the smart widget selection based on the portion of the audio stream;
   rendering the generated content to be displayed as the display element and applying the rendered generated content to the media overlay; and
   causing the media overlay to be displayed with the rendered generated content as the display element.

2. The method of claim 1, further comprising:
   generating a message comprising an image or video and the media overlay; and
   sending the message to a second computing device, wherein the message is displayed on the second computing device with the media overlay applied to the image or video.

3. The method of claim 1, wherein the media overlay is a first media overlay and the context data further comprises geolocation data, and further comprising:
   receiving a second media overlay corresponding to the geolocation data;
   determining that the second media overlay comprises a second smart widget selection corresponding to a display element comprising dynamic content to be displayed on the media overlay based on the context data comprising the geolocation data;
   generating content comprising information about a location corresponding to the geolocation data, the content to be displayed as the display element corresponding the second smart widget selection based on the geolocation data;

rendering the generated content comprising information about the location in the display element on the second media overlay based on attributes of the second smart widget selection; and causing the second media overlay to be displayed with the rendered generated content.

4. The method of claim 1, wherein the media overlay is a first media overlay and the context data further comprises geolocation data, and further comprising:

receiving a second media overlay corresponding to an event associated with the geolocation data;

determining that the second media overlay comprises a second smart widget selection corresponding to a display element comprising dynamic content to be displayed on the media overlay based on the context data comprising the geolocation data;

generating content comprising information about the event corresponding to the geolocation data, the content to be displayed as the display element corresponding the second smart widget selection based on the geolocation data;

rendering the generated content comprising information about the event in the display element on the second media overlay based on attributes of the second smart widget selection; and causing the second media overlay to be displayed with the rendered generated content.

5. The method of claim 1, wherein the media overlay is a first media overlay and the context data further comprises a date for an image or video, and further comprising:

receiving a second media overlay corresponding to the date for the image or video;

determining that the second media overlay comprises a second smart widget selection corresponding to a display element comprising dynamic content to be displayed on the media overlay based on the context data comprising the date for the image or video;

generating content comprising information about the date for the image or video, the content to be displayed as the display element corresponding the second smart widget selection based on the date for the image or video;

rendering the generated content comprising information about the date for the image or video in the display element on the second media overlay based on attributes of the second smart widget selection; and causing the second media overlay to be displayed with the rendered generated content.

6. The method of claim 1, wherein the computing device generates the context data based on at least one of location data, data from an image or video, speed detected, altitude detected, a time of day, a day of the week, weather, temperature, a quick response code or a bar code.

7. The method of claim 1, wherein the computing device sends the context data based on detection of capture of an image or video.

8. A computing device comprising:

one or more hardware processors; and a computer-readable medium coupled with the one or more hardware processors, the computer-readable medium comprising instructions stored thereon that are executable by the one or more hardware processors to cause the computing device to perform operations comprising:

sending, to a computing system, context data associated with the computing device, the context data comprising a portion of an audio stream;

receiving, from the computing system, a media overlay corresponding to the context data;

determining that the media overlay comprises a smart widget selection corresponding to a display element comprising dynamic content to be displayed on the media overlay based on the context data;

based on determining that the media overlay comprises the smart widget selection, generating content comprising information about the portion of the audio stream, the content to be displayed as the display element corresponding to the smart widget selection based on the portion of the audio stream;

rendering the generated content to be displayed as the display element and applying the rendered generated content to the media overlay; and causing the media overlay to be displayed with the rendered generated content as the display element.

9. The computing device of claim 8, the operations further comprising:

generating a message comprising an image or video and the media overlay; and sending the message to a second computing device, wherein the message is displayed on the second computing device with the media overlay applied to the image or video.

10. The computing device of claim 8, wherein the media overlay is a first media overlay and the context data further comprises geolocation data, and the operations further comprising:

receiving a second media overlay corresponding to the geolocation data;

determining that the second media overlay comprises a second smart widget selection corresponding to a display element comprising dynamic content to be displayed on the media overlay based on the context data comprising the geolocation data;

generating content comprising information about a location corresponding to the geolocation data, the content to be displayed as the display element corresponding the second smart widget selection based on the geolocation data;

rendering the generated content comprising information about the location in the display element on the second media overlay based on attributes of the second smart widget selection; and causing the second media overlay to be displayed with the rendered generated content.

11. The computing device of claim 8, wherein the media overlay is a first media overlay and the context data further comprises geolocation data, and the operations further comprising:

receiving a second media overlay corresponding to an event associated with the geolocation data;

determining that the second media overlay comprises a second smart widget selection corresponding to a display element comprising dynamic content to be displayed on the media overlay based on the context data comprising the geolocation data;

generating content comprising information about the event corresponding to the geolocation data, the content to be displayed as the display element corresponding the second smart widget selection based on the geolocation data;

rendering the generated content comprising information about the event in the display element on the second media overlay based on attributes of the second smart widget selection; and causing the second media overlay to be displayed with the rendered generated content.

12. The computing device of claim 8, wherein the media overlay is a first media overlay and the context data further comprises a date for an image or video, and the operations further comprising:
receiving a second media overlay corresponding to the date for the image or video;
determining that the second media overlay comprises a second smart widget selection corresponding to a display element comprising dynamic content to be displayed on the media overlay based on the context data comprising the date for the image or video;
generating content comprising information about the date for the image or video, the content to be displayed as the display element corresponding the second smart widget selection based on the date for the image or video;
rendering the generated content comprising information about the date for the image or video in the display element on the second media overlay based on attributes of the second smart widget selection; and
causing the second media overlay to be displayed with the rendered generated content.

13. The computing device of claim 8, wherein the computing device generates the context data based on at least one of location data, data from an image or video, speed detected, altitude detected, a time of day, a day of the week, weather, temperature, a quick response code or a bar code.

14. The computing device of claim 8, wherein the computing device sends the context data based on detection of capture of an image or video.

15. A non-transitory computer-readable medium comprising instructions stored thereon that are executable by at least one processor to cause a computing device to perform operations comprising:
sending, to a computing system, context data associated with the computing device, the context data comprising a portion of an audio stream;
receiving, from the computing system, a media overlay corresponding to the context data;
determining that the media overlay comprises a smart widget selection corresponding to a display element comprising dynamic content to be displayed on the media overlay based on the context data;
based on determining that the media overlay comprises the smart widget selection, generating content comprising information about the portion of the audio stream, the content to be displayed as the display element corresponding to the smart widget selection based on the portion of the audio stream;
rendering the generated content to be displayed as the display element and applying the rendered generated content to the media overlay; and
causing the media overlay to be displayed with the rendered generated content as the display element.

16. The non-transitory computer-readable medium of claim 15, the operations further comprising:
generating a message comprising an image or video and the media overlay; and
sending the message to a second computing device, wherein the message is displayed on the second computing device with the media overlay applied to the image or video.

17. The non-transitory computer-readable medium of claim 15, wherein the media overlay is a first media overlay and the context data further comprises geolocation data, and the operations further comprising:
receiving a second media overlay corresponding to the geolocation data;
determining that the second media overlay comprises a second smart widget selection corresponding to a display element comprising dynamic content to be displayed on the media overlay based on the context data comprising the geolocation data;
generating content comprising information about a location corresponding to the geolocation data, the content to be displayed as the display element corresponding the second smart widget selection based on the geolocation data;
rendering the generated content comprising information about the location in the display element on the second media overlay based on attributes of the second smart widget selection; and
causing the second media overlay to be displayed with the rendered generated content.

18. The non-transitory computer-readable medium of claim 15, wherein the media overlay is a first media overlay and the context data further comprises geolocation data, and the operations further comprising:
receiving a second media overlay corresponding to an event associated with the geolocation data;
determining that the second media overlay comprises a second smart widget selection corresponding to a display element comprising dynamic content to be displayed on the media overlay based on the context data comprising the geolocation data;
generating content comprising information about the event corresponding to the geolocation data, the content to be displayed as the display element corresponding the second smart widget selection based on the geolocation data;
rendering the generated content comprising information about the event in the display element on the second media overlay based on attributes of the second smart widget selection; and
causing the second media overlay to be displayed with the rendered generated content.

19. The non-transitory computer-readable medium of claim 15, wherein the media overlay is a first media overlay and the context data further comprises a date for an image or video, and the operations further comprising:
receiving a second media overlay corresponding to the date for the image or video;
determining that the second media overlay comprises a second smart widget selection corresponding to a display element comprising dynamic content to be displayed on the media overlay based on the context data comprising the date for the image or video;
generating content comprising information about the date for the image or video, the content to be displayed as the display element corresponding the second smart widget selection based on the date for the image or video;
rendering the generated content comprising information about the date for the image or video in the display element on the second media overlay based on attributes of the second smart widget selection; and
causing the second media overlay to be displayed with the rendered generated content.

20. The non-transitory computer-readable medium of claim 15, wherein the computing device generates the context data based on at least one of location data, data from an image or video, speed detected, altitude detected, a time of day, a day of the week, weather, temperature, a quick response code or a bar code.

\* \* \* \* \*